United States Patent [19]

Womack

[11] Patent Number: 5,159,849
[45] Date of Patent: Nov. 3, 1992

[54] SERPENTINE TUBE INSPECTION POSITIONING SPINE

[75] Inventor: Robert E. Womack, Forest, Va.

[73] Assignee: The Babcock & Wilcox Company, New Orleans, La.

[21] Appl. No.: 772,404

[22] Filed: Oct. 7, 1991

[51] Int. Cl.⁵ .................................................. F16C 1/28
[52] U.S. Cl. .................................. 74/502.3; 74/502.5; 464/178; 403/57; 138/103
[58] Field of Search .............. 74/502, 502.3, 502.4, 74/502.5, 502.6; 59/4, 78, 78.1; 403/41, 53–58; 138/120, 110, 103; 245/4; 464/115–119, 174; 72/466

[56] References Cited

U.S. PATENT DOCUMENTS

| | | | |
|---|---|---|---|
| 708,876 | 9/1902 | Edwards | 74/502 |
| 1,016,770 | 2/1912 | Persons | 72/466 |
| 1,748,158 | 2/1930 | Walp | 72/466 |
| 2,090,207 | 4/1937 | Kliesrath | 74/502 |
| 2,748,803 | 6/1956 | Guarnaschelli | 138/110 |
| 3,020,362 | 2/1962 | Waninger | 59/78.1 |
| 3,197,954 | 8/1965 | Merker et al. | 59/78.1 |
| 3,497,083 | 2/1970 | Anderson et al. | 138/120 |
| 3,583,393 | 6/1971 | Takahasi | 138/103 |
| 3,623,756 | 11/1971 | Fischer | 403/57 |
| 3,625,084 | 9/1972 | Deputy | 74/502.5 |
| 3,918,821 | 11/1975 | Schlegel et al. | 403/57 |
| 4,238,973 | 12/1980 | Polo et al. | 74/502.3 |
| 4,290,762 | 9/1981 | Lapayre | 403/58 |
| 4,648,756 | 3/1987 | Alexander et al. | 173/18 |
| 4,896,555 | 1/1990 | Bailey et al. | 74/502 |

FOREIGN PATENT DOCUMENTS

| | | | |
|---|---|---|---|
| 0755723 | 11/1933 | France | 74/502.5 |
| 0370458 | 4/1939 | Italy | 74/502.5 |
| 0033017 | 2/1987 | Japan | 72/466 |
| 0012705 | of 1888 | United Kingdom | 74/502.3 |

*Primary Examiner*—David A. Scherbel
*Assistant Examiner*—Winnie Yip
*Attorney, Agent, or Firm*—Robert J. Edwards; D. Neil LaHaye

[57] ABSTRACT

A serpentine tube inspection positioning spine formed from a plurality of identical links. Each link has a convex first end and concave second end spaced along the longitudinal axis of the link whereby adjacent links may be mated together. An axially extending bore in each link receives a continuous cable maintained under tension by a spring attached to one end of the cable. This places pressure on the links that serves to maintain the mated links in a rigid straight configuration while under compressive forces during insertion into a tube to be inspected. The resilience of the spring also allows pivoting of adjacent links for travelling through a bend in the tube.

5 Claims, 5 Drawing Sheets

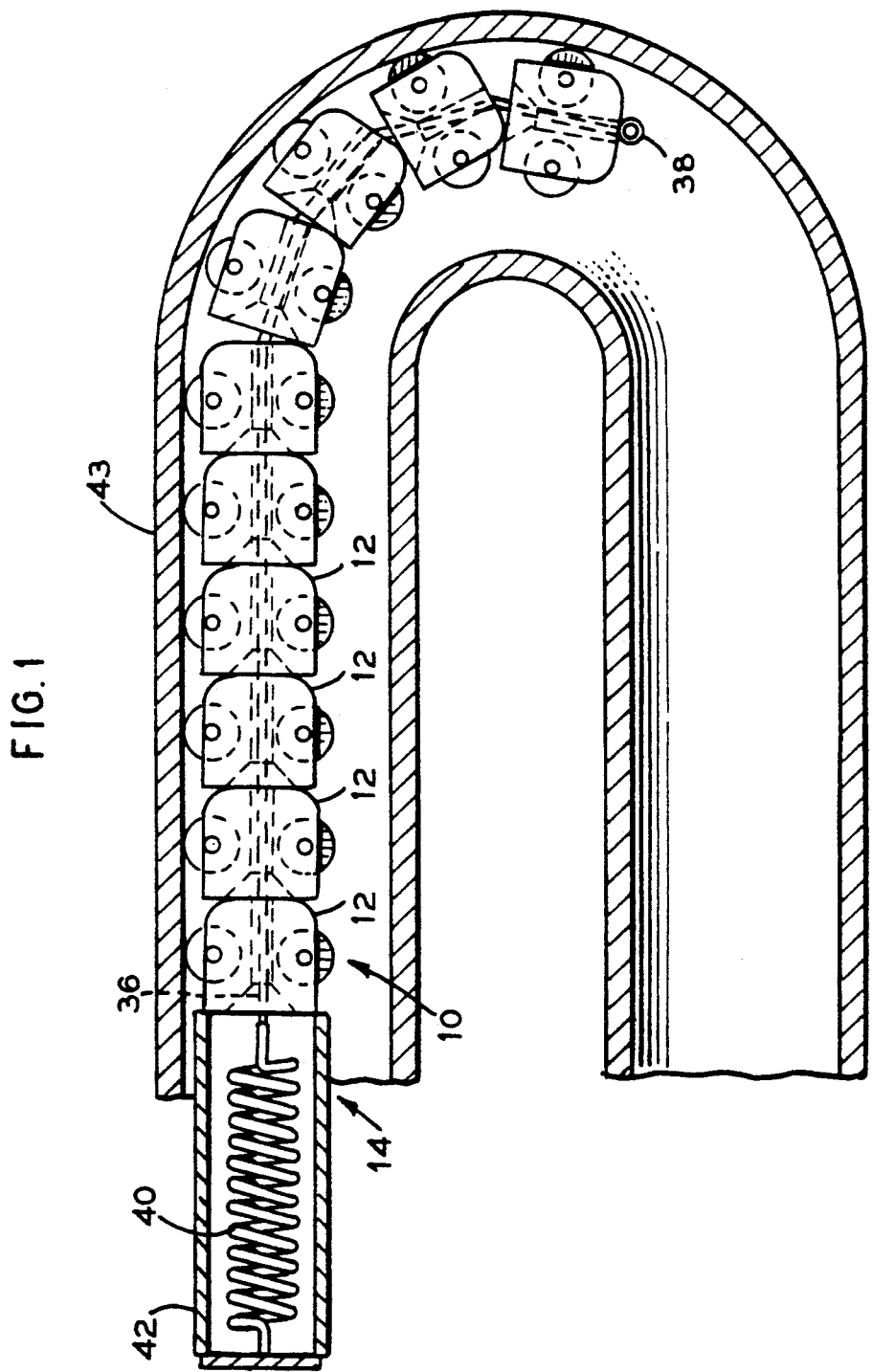

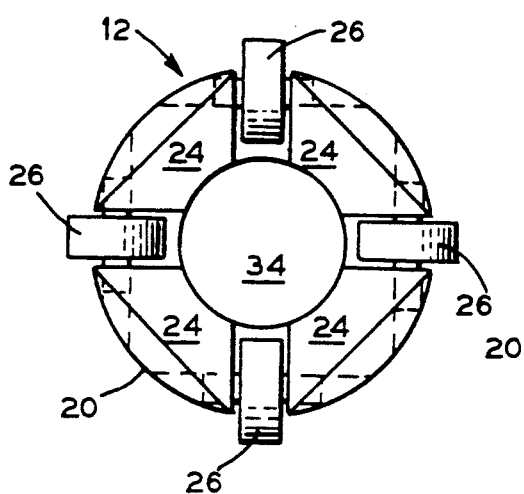
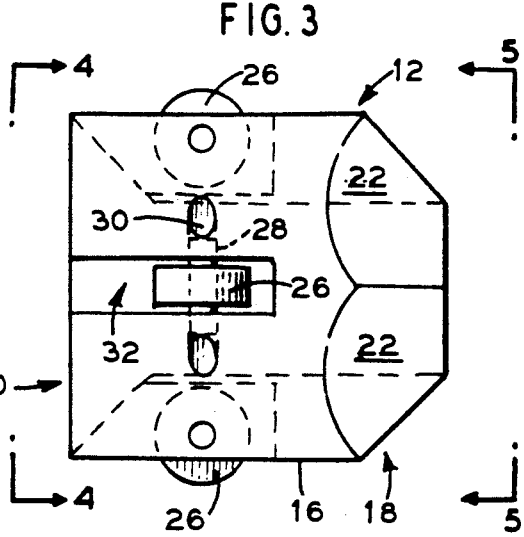
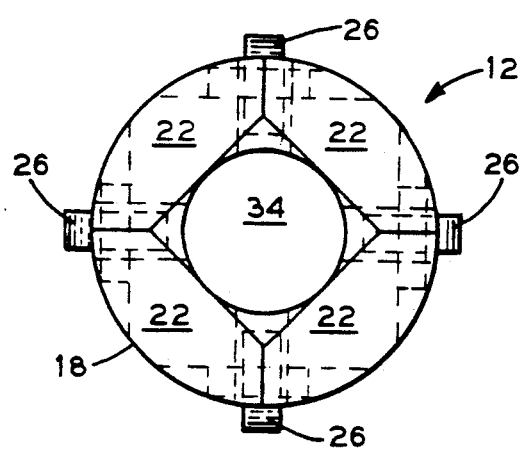
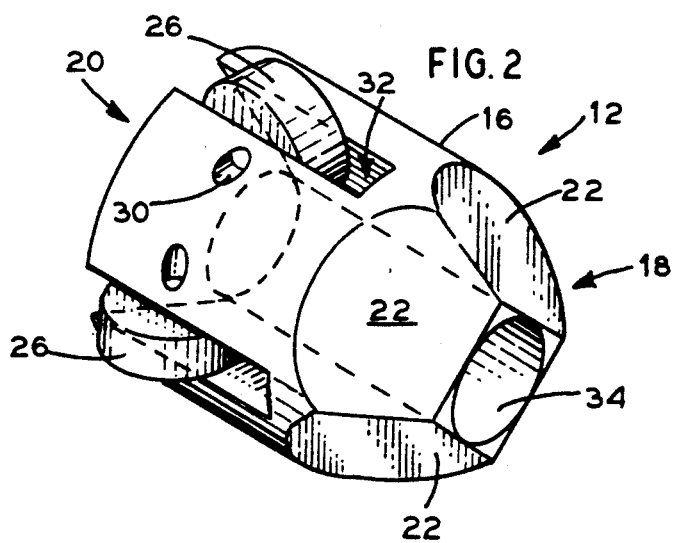

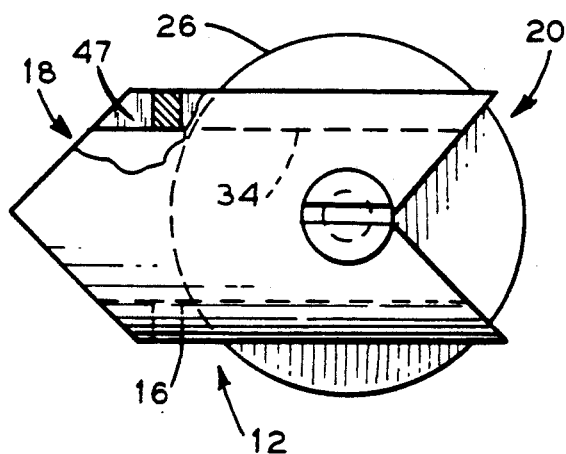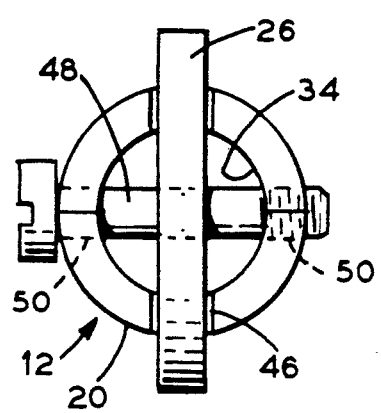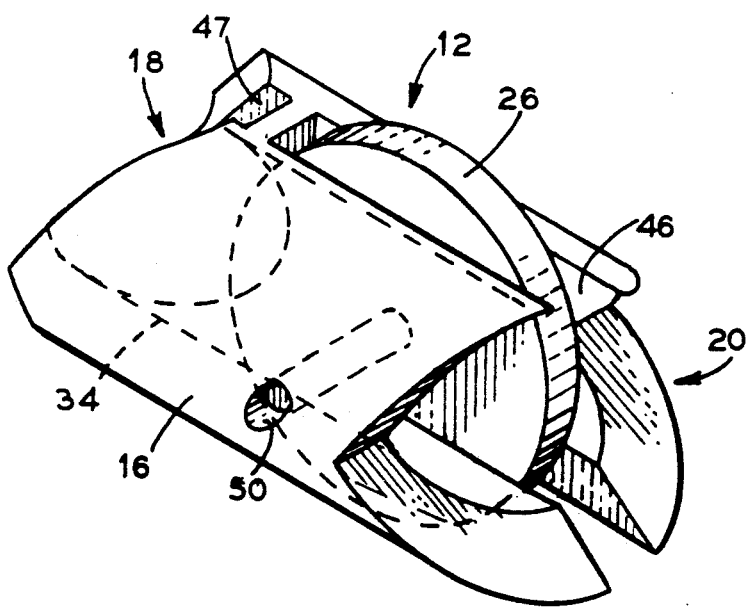

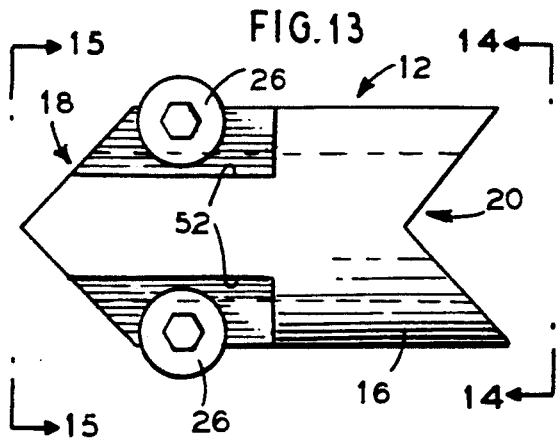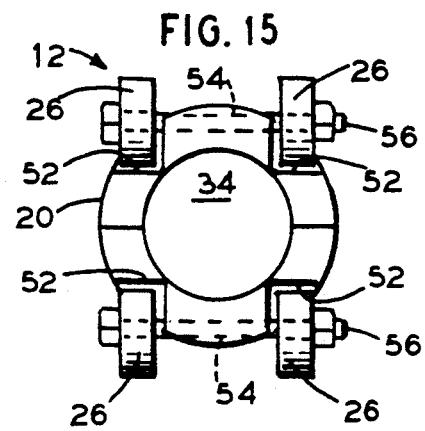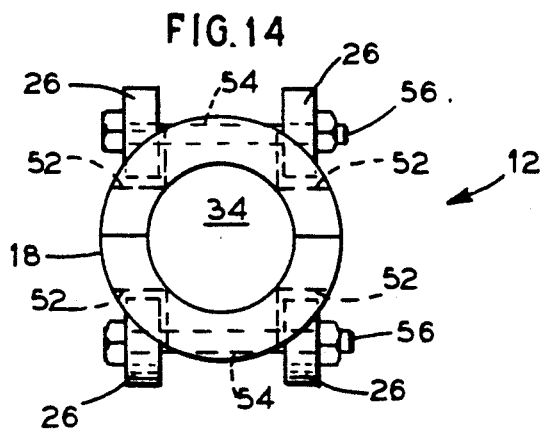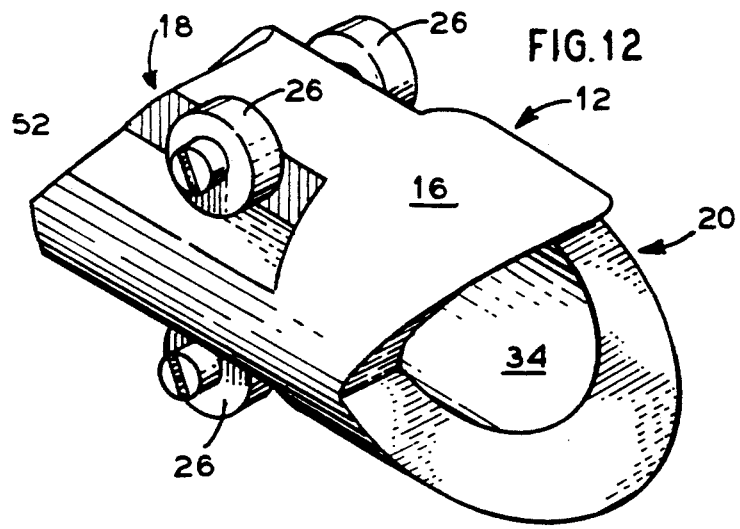

SERPENTINE TUBE INSPECTION POSITIONING SPINE

BACKGROUND OF THE INVENTION

1. Field of the Invention

The present invention is generally related to non-destructive inspection of pipes and tubing and in particular to positioning of inspection devices at various locations along the interior of serpentine-bent tube sections.

2. General Background

Many boilers have serpentine-bent horizontal tube sections. Such tube sections are generally of a 1 to 2 inch inner diameter with multiple (as many as 20) tight radius 180 degree bends and may be several hundred feet long. Non-destructive testing of the interior of the tubing is accomplished by the use of transducers. The type of mechanism used to move a transducer through a tube is chosen depending on tube diameter, the number, direction, extent, and radius of bends, and the length of the tube to be inspected. Moderately short lengths of tubing with few and gradual bends often depend upon a flexible cable similar to a plumber's "snake" for movement of an inspection transducer. Such devices are not known to be applicable to boiler tubes as described above. "Tractor" devices capable of negotiating the sharp bends and pulling a transducer and its signal cable along are also not known. Flexible cables pushed from the end of the tube are impractical beyond the first or second bend in the tubing due to the build up of drag forces. Various devices of which the inventor is aware include the following.

U.S. Pat. Nos. 3,583,393, 3,497,083, and 4,238,973 disclose selectively bendable tube assemblies and manipulators.

U.S. Pat. Nos. 2,748,803 and 4,648,733 disclose a reinforced hose and installation template for conduits.

U.S. Pat. Nos. 3,623,756 and 3,918,821 disclose articulated connectors.

U.S. Pat. Nos. 4,290,762, 3,020,362 and 3,197,954 disclose various link chains.

German patent no. 494,160 discloses a flexible shaft.

French patent no. 1,079,598 discloses a mechanical remote control that uses cables and springs inside a rigid conduit.

U.S. Pat. No. 4,896,555 discloses an inspection spine formed from identical links mated together by a pivot pin at bifurcated ends. Flat alignment faces are provided to prevent buckling during insertion. An oval bore for the pivot pin in one link allows pivoting of links at tubing bends.

Although there are a variety of flexible connectors available, there are few that fit the need to be able to travel through serpentine tube sections as described above where the device must be capable of being pushed through the tubes and then pulled back out once inspection is completed. Also, since there are a variety of tubes and tube configurations, such as tubes that have bends in more than one plane, no one system will serve all applications equally well.

The problems encountered are as follows. During insertion, when the device is being pushed through the tube, compression forces result in the links having a tendency to buckle at the link connecting pivot points, causing lock-up in straight sections of the tube and generating side loads that quickly become unacceptably high. Major drag forces are also generated in the bend areas of the tube during insertion and removal of known devices.

SUMMARY OF THE INVENTION

The present invention addresses the aforementioned need in a straightforward manner. What is provided is a positioning spine formed from a series of identical rigid links. Each link has one end that is convex and one end that is concave. The concave end is shaped and sized to receive the convex end of an adjacent link. Each link is provided with an axial bore therethrough. A cable passes through the bores of the links and is maintained under tension. The tensioned cable allows separation of adjacent links when traveling through a tube bend and also provides a restoring force to cause realignment of the links when not in a tube bend. Wheels rotatably mounted on each link help to reduce friction as the positioning spine is moved through the tube to be inspected.

BRIEF DESCRIPTION OF THE DRAWINGS

For a further understanding of the nature and objects of the present invention, reference should be made to the following description taken in conjunction with the accompanying drawings in which like parts are given like reference numerals and, wherein:

FIG. 1 is a schematic view of the invention in a tube.

FIG. 2 is a perspective view of one link of the preferred embodiment of the invention.

FIG. 3 is a side view of the link of FIG. 2.

FIG. 4 is a view taken along lines 4—4 of FIG. 3.

FIG. 5 is a view taken along lines 5—5 of FIG. 3.

FIG. 9 is a perspective view of one link of another alternate embodiment of the invention.

FIG. 10 is a side partial cutaways view of the link of FIG. 9.

FIG. 11 is an end view of the link of FIG. 9.

FIG. 12 is a perspective view of one link of another alternate embodiment of the invention.

FIG. 13 is a side view of the link of FIG. 12.

FIG. 14 is a view taken along lines 14—14 of FIG. 13.

FIG. 15 is a view taken along lines 15—15 of FIG. 13.

DETAILED DESCRIPTION OF THE PREFERRED EMBODIMENT

Figure 7:
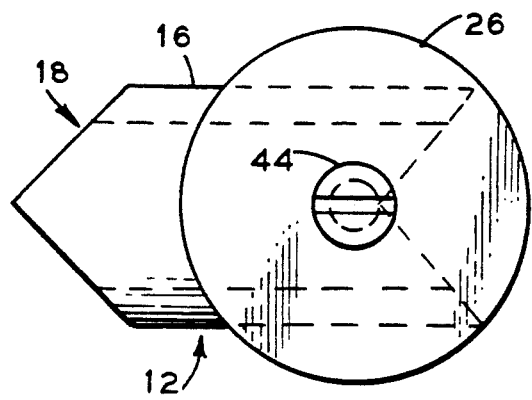
FIG. 7 is a side view of the link of FIG. 6.

Referring to the drawings, it is seen in the schematic view of FIG. 1 that the invention is generally indicated by the numeral 10. Positioning spine 10 is generally comprised of a plurality of rigid links 12 and means 14 for maintaining rigid straightness of links 12 when under compressive forces and for allowing pivoting of one link relative to an adjacent link when travelling through a tube bend.

FIG. 2-5 illustrate one link of the preferred embodiment. All links 12 are identical and are circular in cross section as seen in FIG. 5. As best seen in FIG. 2, each link 12 is formed from a main body portion 16 having a substantially convex first end 18 and a substantially concave second end 20 spaced along the longitudinal axis of link 12. Concave first end 18 is provided with a plurality of flat faces 22. Four flat faces 22 are provided in the preferred embodiment. Concave second end 22 has a complementary size and shape to that of concave first end 18 for receiving the first end of an adjacent link 12 for mating therewith. Concave second end 20 is provided with a plurality of flat faces 24, best seen in FIG. 4, that substantially match the angle and size of flat faces 22. Each link 12 is provided with wheels 26 rotatably mounted thereon in a manner to allow positioning spine 10 to travel through tubes having bends in more than one plane. Each wheel 26 is rotatably mounted on an axle 28 received in a bore 30. Each axle 28 and bore 30 is spaced radially from the longitudinal axis of link 12 and in a plane orthogonal to the longitudinal axis. Each wheel 26 therefore rotates in a plane radial to the longitudinal axis. In the preferred embodiment, four wheels 26 are spaced around link 12. A portion of each wheel 26 is received in its respective slot 32. In this arrangement, the planes of rotation of wheels 26 all intersect at substantially the center of the longitudinal axis of link 12. Each link 12 is provided with longitudinal or axially extending bore 34 therethrough.

Means 14 for maintaining rigid straightness of mated links 12 when under compressive forces and for allowing pivoting of one link relative to an adjacent link when travelling through a tube bend is provided in the form of tensioned cable 36. As best seen in the schematic view of FIG. 1, cable 36 is passed through bore 34 of a plurality of links 12. At one end cable 36 is provided with any suitable means such as eye 38 to prevent cable 36 from being pulled back through and out of links 12 when tension is applied to cable 36. Tension on cable 36 is provided by spring 40 attached to the opposite end of cable 36. Spring 40 is attached at one end to cable 36 and at its opposite end to spring housing 42. Tension on cable 36 causes links 12 to be held closely together where the convex first end of one link is received by the concave second end of an adjacent link to form positioning spine 10. The tension of cable 36 on links 12 maintains the rigid straightness of the mated links to prevent buckling between links when under compressive forces while being inserted into tube 43. Spring 40, while maintaining tension on cable 36 and links 12, allows pivoting of one link relative to an adjacent link when travelling through a tube bend. The side loads generated between links when in a tube bend exerts enough force through cable 36 to stretch spring 40. This effectively increases the length of cable 36 passing through the links in the tube bend and allows pivoting of the links to negotiate the tube bend. Once through the tube bend the links that were allowed to pivot are automatically returned to their mated straight configuration by tension on cable 36 while succeeding links are allowed to pivot in a similar manner.

Figure 8:
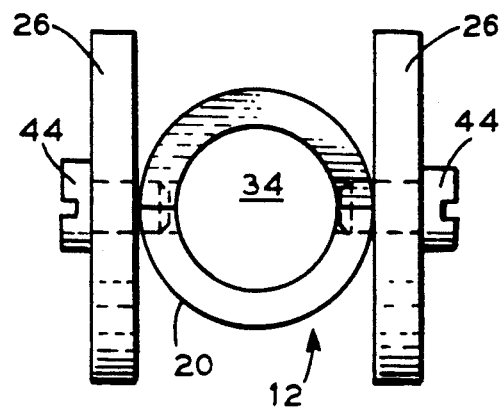
FIG. 8 is an end view of the link of FIG. 6.
Figure 6:
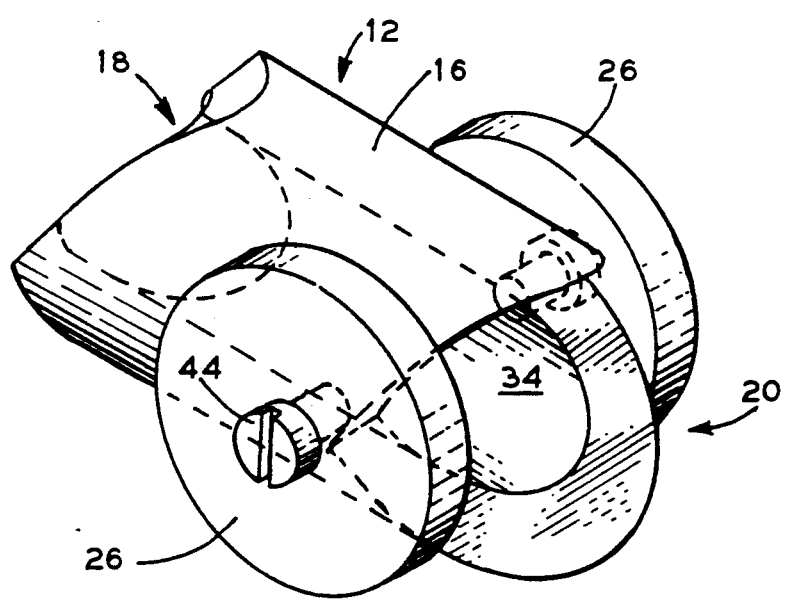
FIG. 6 is a perspective view of one link of an alternate embodiment of the invention.

FIG. 6-8 illustrate an alternate embodiment of the links 12 of the invention wherein the convex first end 18 and concave second end 20 of main body portion 16 are V-shaped. This provides ends each having two complementary faces where concave second end 20 can receive the convex first end 18 of an adjacent link for mating therewith in a similar manner to the preferred embodiment. This embodiment of link 12 is also provided with axially extending bore 34 therethrough. Instead of four wheels, this embodiment of links 12 is provided with two wheels 26 rotatably mounted thereon. As best seen in FIG. 6 and 8, wheels 26 are rotatably mounted on individual axles 44. Axles 44 may be attached to main body portion 16 by any suitable means such as press fitting or by threaded engagement. Wheels 26 are spaced 180 degrees apart around main body portion 16 and rotate in planes parallel to the longitudinal axis of link 12. This embodiment is particularly suitable for use in tubes having bends in only one plane. As in the preferred embodiment, means 14 for maintaining rigid straightness of the mated links when under compressive forces and for allowing pivoting of one link relative to an adjacent link is provided in the form of cable 36, spring 40, and spring housing 42.

FIG. 9-11 illustrate an alternate embodiment of the links 12 of the invention similar to that of FIG. 6-8. As in the embodiment of FIG. 6-8, main body portion 16 has V-shaped convex first end 18 and V-shaped concave second end 20 spaced along the longitudinal axis. Main body portion 16 is also provided with axially extending bore 34 therethrough. This embodiment is provided with one wheel 26 rotatably mounted thereon. Wheel 26 is received in slot 46 that extends radially along main body portion 16 and axially from concave second end 20 on axle 48. Axle 48 is received in radial bores 50 on either side of slot 46. Axle 48 may be secured in its installed position by threaded engagement with one of bores 50 as seen in FIG. 11 or by any other suitable method. Slot 47 is provided in first end 18 for receiving wheel 26 of an adjacent link. As in the preferred embodiment, means 14 for maintaining rigid straightness of mated links 12 when under compressive forces and for allowing pivoting of one link relative to an adjacent link is provided in the form of cable 36, spring 40, and spring housing 42.

FIG. 12-15 illustrate an alternate embodiment of the links 12 of the invention similar to that of FIG. 6-8 and 9-11. As in those embodiments, main body portion 16 has V-shaped convex first end 18 and V-shaped concave second end 20 spaced along the longitudinal axis. Main body portion 16 is also provided with axially extending bore 34 therethrough. This embodiment is provided with four wheels 26 rotatably mounted thereon. Four L-shaped cutouts 52 are provided on main body portion 16 and extend toward convex first end 18. Two parallel bores 54 that are orthogonal to the longitudinal axis of link 12 are provided in main body portion 16. Each bore 54 runs between two L-shaped cutouts 52 and receives an axle 56. One wheel 26 is received on either end of axle 56 in L-shaped cutout 52. Axles 56 may be secured in their installed position by any suitable means such as having a head on one end and a nut threadably received on the other end as illustrated in the drawings. Although wheels 26 are illustrated as all rotating in the same plane this may be varied to accommodate use in tubes having bends in more than one plane. As in the preferred embodiment, means 14 for maintaining rigid straightness of mated links 12 when under compressive forces and for allowing pivoting of one link relative to an adjacent link is provided in the form of cable 36, spring 40, and spring housing 42.

In operation, a plurality of links 12 have cable 36 received through their longitudinal bores 34. Cable 36 has eye 38 attached at one end and the opposite end attached to spring 40. The length of cable 36 is selected according to the number of links 12 used such that tension is maintained on cable 36 and links 12 by spring 40. Eye 38 prevents cable 36 from being pulled out of links 12. The pressure on links 12 serves as a means of maintaining rigid straightness of the mated links when under compressive forces encountered during insertion into a tube 43 to be inspected. The convex first end 18 of one link is received by the concave second end 20 of an adjacent link. This, along with the matching faces on the link ends, also contributes toward preventing buckling of the links when under compressive forces. Spring housing 42 may serve as a rigid member used to provide pressure against links 12 during insertion into tube 43. When links 12 reach a bend in tube 43, spring 40 is caused to lengthen by the turning forces on links 12 and increased tension on cable 36. This results in a change in the effective length of cable 36 that allows pivoting of adjacent links to travel through the bend in tube 43. Once through the bend these links return to their normal mated straight configuration due to pressure from cable 36 while succeeding links are allowed to pivot in the same manner. During insertion and removal wheels 26 reduce drag while rolling on the interior of tube 43. During removal the tension on the links allows alignment of the links in conjunction with the geometry of the tube. Links 12 may be formed from any suitable solid material. For purposes of economy, castables such as metal or plastic are preferred. It should be understood that only the positioning spine 10 is referred to for ease of illustration and description. During use, any suitable apparatus known in the art such as an ultrasonic or eddy current test system, a miniature television camera, or cleaning and surface sampling devices would be attached to or integral with link 12 that is at the end of cable 36 farthest from spring 40.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A positioning spine, comprising:
  a. a plurality of identical links;
  b. each link having a longitudinal axis and an axially extending bore;
  c. each link having a convex first end and a concave second end spaced along the longitudinal axis with each end having a plurality of flat faces, said concave second end having a complementary size and shape for receiving the convex first end of an adjacent link for mating therewith;
  d. means for maintaining rigid straightness of said mated links when under compressive forces and for allowing pivoting of one link relative to an adjacent link, comprising:
    i. a cable received through the axial bore of each of said links; and
    ii. a spring attached to one end of said cable for maintaining tension on said cable and said links; and
  e. a plurality of wheels rotatably mounted on each of said links where the planes of rotation of said wheels are radial to the longitudinal axis and intersect at substantially the center of the longitudinal axis of the link.

2. A positioning spine, comprising:
  a. a plurality of identical links;
  b. each link having a longitudinal axis and an axially extending bore;
  c. each link having a convex V-shaped first end and a concave V-shaped second end spaced along the longitudinal axis, said concave second end having a complementary size and shape for receiving the convex first end of an adjacent link for mating therewith; and
  d. means for maintaining rigid straightness of said mated links when under compressive forces and for allowing pivoting of one link relative to an adjacent link, comprising:
    i. a cable received through the axial bore of each of said links; and
    ii. a spring attached to one end of said cable for maintaining tension on said cable and said links.

3. The positioning spine of claim 2, further comprising at least two wheels rotatably mounted on each of said links.

4. The positioning spine of claim 2, further comprising one wheel rotatably mounted on each of said links.

5. The positioning spine of claim 2, further comprising four wheels rotatably mounted on each of said links.

* * * * *